US009141683B1

(12) United States Patent
Nagargadde et al.

(10) Patent No.: US 9,141,683 B1
(45) Date of Patent: Sep. 22, 2015

(54) DISTRIBUTED COMPUTER SYSTEM SNAPSHOT INSTANTIATION WITH VARIABLE DEPTH

(71) Applicant: Amazon Technologies, Inc., Reno, NV (US)

(72) Inventors: Aparna Nagargadde, Herndon, VA (US); Michael Brooke Furr, Washington, DC (US)

(73) Assignee: Amazon Technologies, Inc., Reno, NV (US)

( * ) Notice: Subject to any disclaimer, the term of this patent is extended or adjusted under 35 U.S.C. 154(b) by 17 days.

(21) Appl. No.: 14/034,445

(22) Filed: Sep. 23, 2013

Related U.S. Application Data

(63) Continuation of application No. 13/236,347, filed on Sep. 19, 2011, now Pat. No. 8,577,842.

(51) Int. Cl.
*G06F 17/30* (2006.01)
*G06F 11/14* (2006.01)

(52) U.S. Cl.
CPC ...... *G06F 17/30575* (2013.01); *G06F 11/1464* (2013.01); *G06F 11/1469* (2013.01); *G06F 2201/84* (2013.01)

(58) Field of Classification Search
CPC .......... G06F 17/30067; G06F 11/1464; G06F 2201/84; G06F 11/1469
USPC ................................................. 707/639, 803
See application file for complete search history.

(56) References Cited

U.S. PATENT DOCUMENTS

| 5,157,779 | A | 10/1992 | Washburn et al. |
| 6,237,001 | B1 | 5/2001 | Bamford et al. |
| 6,421,767 | B1 | 7/2002 | Milillo et al. |
| 6,873,987 | B1 | 3/2005 | Novaes et al. |
| 6,898,791 | B1 * | 5/2005 | Chandy et al. ............... 719/314 |
| 7,016,313 | B1 | 3/2006 | Harper |
| 7,203,868 | B1 * | 4/2007 | Evoy ............................... 714/39 |
| 7,236,987 | B1 * | 6/2007 | Faulkner et al. ..................... 1/1 |
| 7,240,325 | B2 | 7/2007 | Keller |
| 7,292,579 | B2 | 11/2007 | Morris |

(Continued)

FOREIGN PATENT DOCUMENTS

WO     2012129219     9/2012

OTHER PUBLICATIONS

Brinkmann et al., "Realizing Multilevel Snapshots in Dynamically Changing Virtualized Storage Environments", In the Proceedings of the International Conference on Networking, International Conference on Systems and International Conference on Mobile Communications and Learning Technologies (ICNICONSMCL'06), IEEE, 9 pages, 2006.*

(Continued)

*Primary Examiner* — Phuong Thao Cao
(74) *Attorney, Agent, or Firm* — Kilpatrick Townsend & Stockton LLP

(57) ABSTRACT

Distributed computer systems prepare and instantiate snapshots by processing sets of nodes representing computer resources that are portions of a larger system. A user may choose to prepare or instantiate a snapshot containing all or only a portion of the data within the distributed computer system, such as a template of the distributed computer system. A template snapshot may be available in an electronic marketplace for other users to purchase and instantiate into a replica of the distributed computer system.

19 Claims, 12 Drawing Sheets

(56) References Cited

U.S. PATENT DOCUMENTS

| | | | |
|---|---|---|---|
| 7,325,046 B1 | 1/2008 | Novaes et al. | |
| 7,383,381 B1* | 6/2008 | Faulkner et al. | 711/114 |
| 7,430,568 B1* | 9/2008 | DeKoning et al. | 1/1 |
| 7,523,276 B1 | 4/2009 | Shankar | |
| 7,680,836 B2* | 3/2010 | Anderson et al. | 707/999.202 |
| 7,827,350 B1 | 11/2010 | Jiang et al. | |
| 7,840,787 B2 | 11/2010 | De Pauw et al. | |
| 7,949,692 B2* | 5/2011 | Lemar et al. | 707/822 |
| 7,961,594 B2 | 6/2011 | Alon et al. | |
| 7,966,615 B2 | 6/2011 | Venkitachalam et al. | |
| 7,970,740 B1 | 6/2011 | Hahn et al. | |
| 8,024,535 B2 | 9/2011 | Galipeau et al. | |
| 8,037,264 B2 | 10/2011 | Koning et al. | |
| 8,281,093 B1* | 10/2012 | Krishnan et al. | 711/162 |
| 8,301,759 B2 | 10/2012 | Pietrek et al. | |
| 8,464,250 B1 | 6/2013 | Ansel | |
| 8,577,842 B1 | 11/2013 | Nagargadde et al. | |
| 8,689,214 B2 | 4/2014 | Marshall et al. | |
| 8,707,299 B1* | 4/2014 | Bezbaruah et al. | 718/1 |
| 8,719,767 B2* | 5/2014 | Bansod | 717/101 |
| 2001/0044807 A1 | 11/2001 | Kleiman et al. | |
| 2002/0049778 A1* | 4/2002 | Bell et al. | 707/200 |
| 2003/0009431 A1* | 1/2003 | Souder et al. | 707/1 |
| 2003/0110445 A1 | 6/2003 | Khaleque | |
| 2003/0182313 A1* | 9/2003 | Federwisch et al. | 707/200 |
| 2003/0182326 A1* | 9/2003 | Patterson | 707/204 |
| 2004/0046785 A1 | 3/2004 | Keller | |
| 2004/0093381 A1 | 5/2004 | Hodges et al. | |
| 2004/0123183 A1* | 6/2004 | Tripathi et al. | 714/31 |
| 2004/0267922 A1 | 12/2004 | Rover et al. | |
| 2005/0010592 A1* | 1/2005 | Guthrie | 707/104.1 |
| 2005/0102396 A1 | 5/2005 | Hipp | |
| 2005/0114402 A1* | 5/2005 | Guthrie | 707/200 |
| 2006/0123016 A1 | 6/2006 | Ashok et al. | |
| 2006/0123209 A1* | 6/2006 | Borland | 711/162 |
| 2006/0212481 A1 | 9/2006 | Stacey et al. | |
| 2006/0245431 A1 | 11/2006 | Morris | |
| 2006/0248300 A1 | 11/2006 | Kaushik et al. | |
| 2006/0294435 A1 | 12/2006 | Vick et al. | |
| 2007/0106857 A1 | 5/2007 | Koning et al. | |
| 2008/0028402 A1 | 1/2008 | Senoo | |
| 2008/0046476 A1* | 2/2008 | Anderson et al. | 707/200 |
| 2008/0168427 A1 | 7/2008 | Bestgen et al. | |
| 2008/0183973 A1* | 7/2008 | Aguilera et al. | 711/147 |
| 2008/0201307 A1* | 8/2008 | Swartz | 707/3 |
| 2008/0201711 A1 | 8/2008 | Amir Husain | |
| 2008/0320546 A1* | 12/2008 | Moon et al. | 725/136 |
| 2009/0043977 A1 | 2/2009 | Kamay et al. | |
| 2009/0055604 A1* | 2/2009 | Lemar et al. | 711/161 |
| 2009/0193094 A1 | 7/2009 | Scholl et al. | |
| 2009/0240744 A1 | 9/2009 | Thomson et al. | |
| 2009/0288084 A1* | 11/2009 | Astete et al. | 718/1 |
| 2009/0320011 A1 | 12/2009 | Chow et al. | |
| 2010/0082921 A1* | 4/2010 | Thompson et al. | 711/162 |
| 2010/0088481 A1 | 4/2010 | Kaushik et al. | |
| 2010/0106678 A1 | 4/2010 | Pietrek et al. | |
| 2010/0107158 A1 | 4/2010 | Chen et al. | |
| 2010/0115334 A1* | 5/2010 | Malleck et al. | 714/15 |
| 2010/0142943 A1 | 6/2010 | Frankel et al. | |
| 2010/0161556 A1 | 6/2010 | Anderson et al. | |
| 2010/0250499 A1* | 9/2010 | McAlister et al. | 707/679 |
| 2010/0281473 A1 | 11/2010 | Zhang et al. | |
| 2011/0044209 A1 | 2/2011 | Fachan | |
| 2011/0087635 A1 | 4/2011 | Fachan et al. | |
| 2011/0119234 A1 | 5/2011 | Schack et al. | |
| 2011/0238936 A1* | 9/2011 | Hayden | 711/162 |
| 2011/0258461 A1 | 10/2011 | Bates | |
| 2011/0264787 A1 | 10/2011 | Mickens et al. | |
| 2012/0011100 A1 | 1/2012 | Yamane et al. | |
| 2012/0011509 A1 | 1/2012 | Husain | |
| 2012/0030513 A1 | 2/2012 | Peng et al. | |
| 2012/0054715 A1 | 3/2012 | Welchman et al. | |
| 2012/0110344 A1* | 5/2012 | Sadovsky et al. | 713/189 |
| 2012/0158662 A1 | 6/2012 | Buragohain et al. | |
| 2012/0174069 A1 | 7/2012 | Zavatone | |
| 2012/0198448 A1 | 8/2012 | Cervantes et al. | |
| 2012/0233610 A1 | 9/2012 | Mandre | |
| 2012/0239987 A1 | 9/2012 | Chow et al. | |
| 2012/0246636 A1 | 9/2012 | Stich et al. | |
| 2012/0246640 A1 | 9/2012 | Marshall et al. | |
| 2012/0303585 A1 | 11/2012 | Zuckerman et al. | |
| 2013/0085999 A1* | 4/2013 | Tung et al. | 707/654 |

OTHER PUBLICATIONS

U.S. Appl. No. 13/236,347, "Notice of Allowance", May 21, 2013, 17 pages.

U.S. Appl. No. 13/236,347, "Office Action", Dec. 28, 2012, 16 pages.

U.S. Appl. No. 13/236,347, filed Sep. 19, 2011, Titled: Distributed Computer System Snapshots and Instantiation Thereof.

Agbaria et al., "Distributed Snapshots for Mobile Computing Systems", In Proceedings of the 2nd IEEE International Conference on Pervasive Computing and Communications (PerCOM'04), Mar. 2004, 9 pages.

Chandy et al., "Distributed Snapshots: Determining Global States of Distributed Systems", ACM Transactions on Computer Systems, vol. 3, No. 1, Feb. 1, 1985, pp. 63-75.

Garg et al., "Scalable Algorithms for Global Snapshots in Distributed Systems", ACM, In Proceedings of the 20th AnnualInternational Conference on Supercomputing (ICS'06), 2006, pp. 269-277.

Kangarlou et al., "Taking Snapshots of Virtual Networked Environments", ACM, In Proceedings of the 2nd International Workshop on Virtualization Technology in Distributed Computing, 2007, 8 pages.

Kangarlou et al., "VNsnap: Taking Snapshots of Virtual Networked Environments with Minimal Downtime", In proceedings of the 39th IEEE/IFIP International Conference on Dependable Systems and Networks (DSN-DCCS 2009), Estoril, Portugal, Jun. 2009, pp. 524-533.

Yu et al., "SNPdisk: An Efficent Para-Virtulization Snapshot Mechanism for Virtual Disks in Private Clouds", IEEE Network Jul./Aug. 2011, pp. 20-26.

* cited by examiner

DISTRIBUTED COMPUTER SYSTEM SNAPSHOT INSTANTIATION WITH VARIABLE DEPTH

CROSS-REFERENCE TO RELATED APPLICATIONS

This application is a continuation of prior U.S. application Ser. No. 13/236,347, filed on Sep. 19, 2011, issued as U.S. Pat. No. 8,577,842 on Nov. 5, 2013, titled "Distributed Computer System Snapshots and Instantiation Thereof," and incorporates by reference U.S. application Ser. No. 13/070,812, filed on Mar. 24, 2011, titled "Replication of Machine Instances in a Computing Environment" the contents of which are each hereby incorporated in their entirety by reference.

BACKGROUND

Distributed computer system information can be complex to manage. Some companies, therefore, choose to have production and testing environments. Should a bug be discovered in the production environment, responsible engineers may try to replicate the bug in the testing environment. However, as these systems may involve large computing environments, an engineer may have to spend time to back up and restore the production computing environment using another system in order to track down the bug. In some cases, each service and its associated data may be individually backed up from within the distributed computer system.

Properly backing up information becomes particularly important when services and data are not synchronized correctly. If expected data is not fully propagated across each backup, service errors may occur. For example, an engineer may individually back up each service while the system is operating in order to minimize system downtime. However, any new information received between the first service backup and the last service backup may not be present in the first service backup. If a distributed computer system is restored from these backups that include a timing difference, errors may occur. Because of the timing difference, a user may not be populated in a user registration service that was backed up first, but may have purchases recorded on a fulfillment server that was backed up last. An attempt to recall user information related to a purchase on the fulfillment server may fail due to the unexpected information mismatch. While various techniques have been employed to effectively backup and restore distributed computer systems, due to the complexity of the tasks, the employed techniques are of varied success.

DETAILED DESCRIPTION

Figure 1:
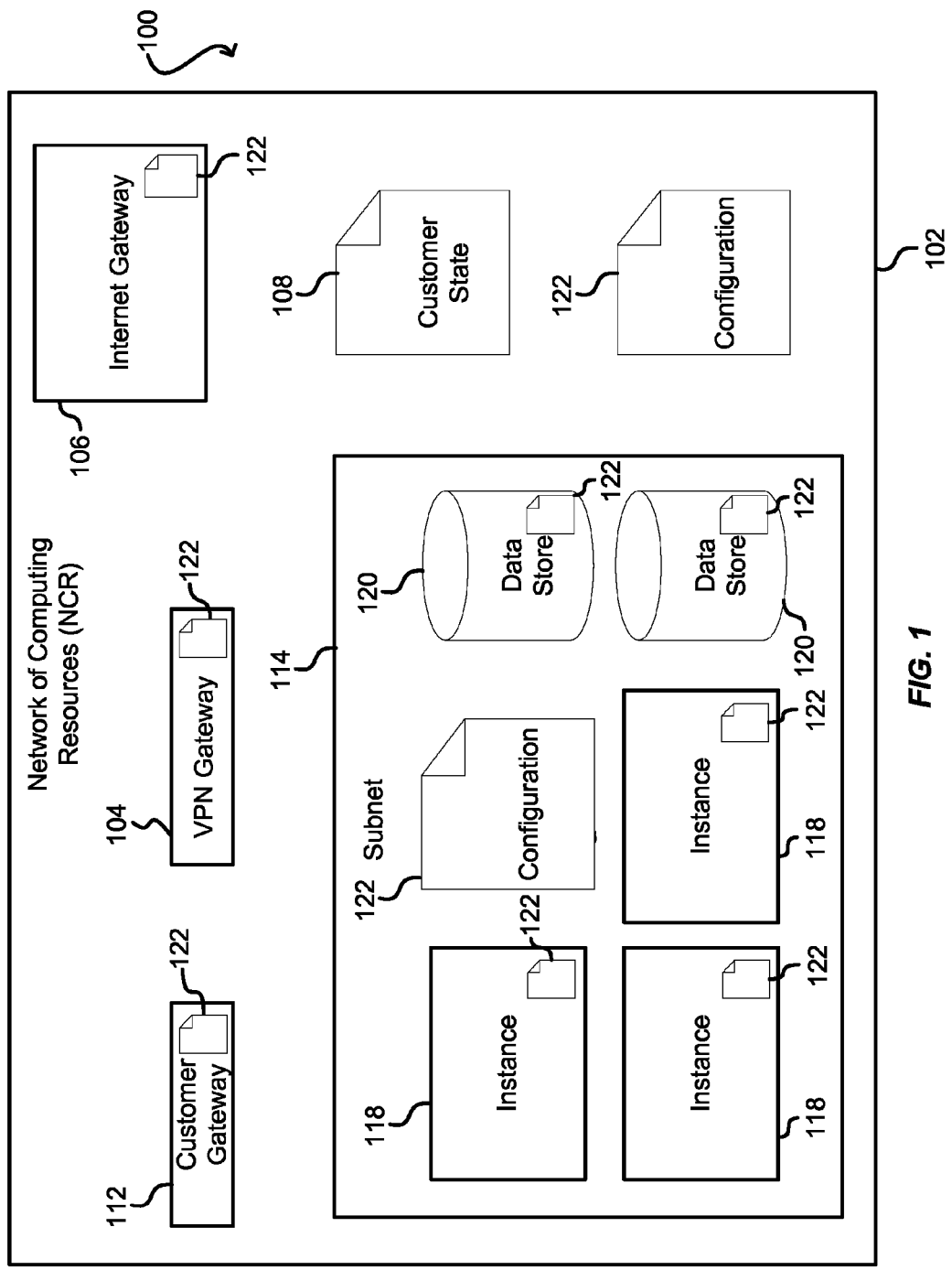
FIG. 1 shows an illustrative example of a distributed computer system environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for preparing and restoring snapshots of distributed computing systems, which may include cloud systems. The snapshots, in some embodiments, are each a collection of information representing parts of a distributed computing system at a point in time. The computing resources, including network resources, may be represented as a set of linked nodes, where each link represents a relationship between two nodes. Computing resources may include computing systems, such as servers, and also network resources, such as routers, that have information, such as data and state, that may be stored in a snapshot. In one embodiment, the relationship between the nodes is such that each node is a parent and/or child of at least one other node, the resulting set forming a tree of nodes. A head or top node of the set may represent the largest part of the system, such as an entire cloud, while each child node might represent a specific portion of the system and/or a parent node, such a data store being contained in a subnet. In one example, a cloud may include a shared pool of configurable computing resources. The cloud may be represented by a cloud node, where the individual computing resources may be represented by child nodes, grandchild nodes or other descendant nodes from the cloud node. In some embodiments, the node may contain all the associated data for a computing resource. In other embodiments, data within the node may be placed in child nodes.

To prepare a snapshot of a distributed computing system, the computing resources contained within the system can be represented as such a set of nodes. The system may start with a top or head node in the hierarchy and traverse each node according to the hierarchical links while determining whether to store some or all of the information in each node. Relationship information between the nodes may be stored as links between the nodes or as metadata. Dependency information between computing resources may also be noted as metadata within the computing resources. In one embodiment, the distributed computing system is structured such that each computing resource node is defined as contained within a larger computing resource node, up to the head computing resource node. A link between computing resource nodes may then represent that an child computing resource was contained within, or is otherwise a part of, the parent computing resource. The collection of computing resource nodes may form a tree. The tree of computing resource nodes may be traversed to look for information to store in the snapshot, resulting in a collection of stored nodes representing a snapshot of the distributed computer system.

Instantiating a snapshot may also use the node representation of a set of stored computing resources. In one embodiment, an instantiating system may first traverse a set of stored nodes looking for dependencies. The dependencies may be implicitly known by the instantiating system or explicitly defined, such as within metadata. Each dependency may be noted and a data structure, such as a data structure that encodes a directed acyclic graph (a "DAG"), may be created showing independent and dependent nodes. The DAG may be used to instantiate independent nodes or computing resources before dependent nodes or resources are instantiated. The instantiation of a snapshot may include the functions of restoring, cloning and copying of distributed computing systems from a snapshot.

A snapshot may be prepared with only specified data from the nodes. In one embodiment, a user may selectively prepare a snapshot with template information, production data and/or configuration information. A template snapshot may include information to replicate structure and operation of a distributed computing system without the operational data, such as usernames and passwords. The template snapshot may be useful to provide to another entity that wishes to operate a similar distributed computer system. For example, a template snapshot may enable a user to instantiate a new social networking website with the functionality of the original social networking website from a snapshot, but without the customer data. A template snapshot with production data may include the template information along with live production data from the original distributed computer system. The template snapshot with production data may be useful, for example, in a test environment. Configuration information may include information specific to the installation of the specific distributed computing system. The template snapshot with production data and configuration information may be used to instantiate the distributed computing system to as it was at the time the snapshot was taken and may be useful in quick recovery situations.

A snapshot may be instantiated with all or part of the information contained within the snapshot. For example, a snapshot with template information, production data and configuration information may be used to instantiate a template of the original distributed computing system, since template information is contained within the snapshot. In a contrasting example, however, a snapshot with template data, but without production data and configuration information, may only instantiate a template of the original distributed computing system, as the snapshot does not contain further data or information.

FIG. 1 shows an illustrative example of a distributed computer system as a cloud service 100. A network of computing resources (or "NCR") 102 may allow a customizable definition of computing resources and network topology. In the embodiment shown, parent computing resources may be seen as containing, or otherwise being a part of, the parent computing resource. Here, the NCR 102 may contain a virtual private network 104, customer gateway 112, subnet 114 and internet gateway 106. There may be multiple of each kind of computing resource. For example, there may be multiple subnets within the NCR. The NCR 102 may also contain further information, as may include configuration 122 and customer state information 110. Customer state information 110 may include configurations and/or descriptions of customer devices outside of the network of computing resources. For example, customer router settings for a router at the company offices may be stored in the customer state information 110. The customer gateway 112 may provide external private access to the NCR.

The first child node contained in the NCR 102 may correspond to the virtual private network 104. The virtual private network 104 may provide access and routing information for a part of the NCR 102. The virtual private network 104 may also have child computing resources. The virtual private network 104 may also include configuration information 122.

In the embodiment shown, the subnet 114 may provide a network structure for computing and data storage resources. The subnet 114 may have child computing resources including computing instances 118 (sometimes simply referred to as "instances"), data stores 120 and configuration information 122. Instances 118 may include computing resources with configuration 122. Data stores may provide storage, including database storage and/or file storage, for the instances 118 or other needs, and include their own configuration 122. Data stores may also include separate services for file storage, database storage and other types of data storage.

Figure 2:
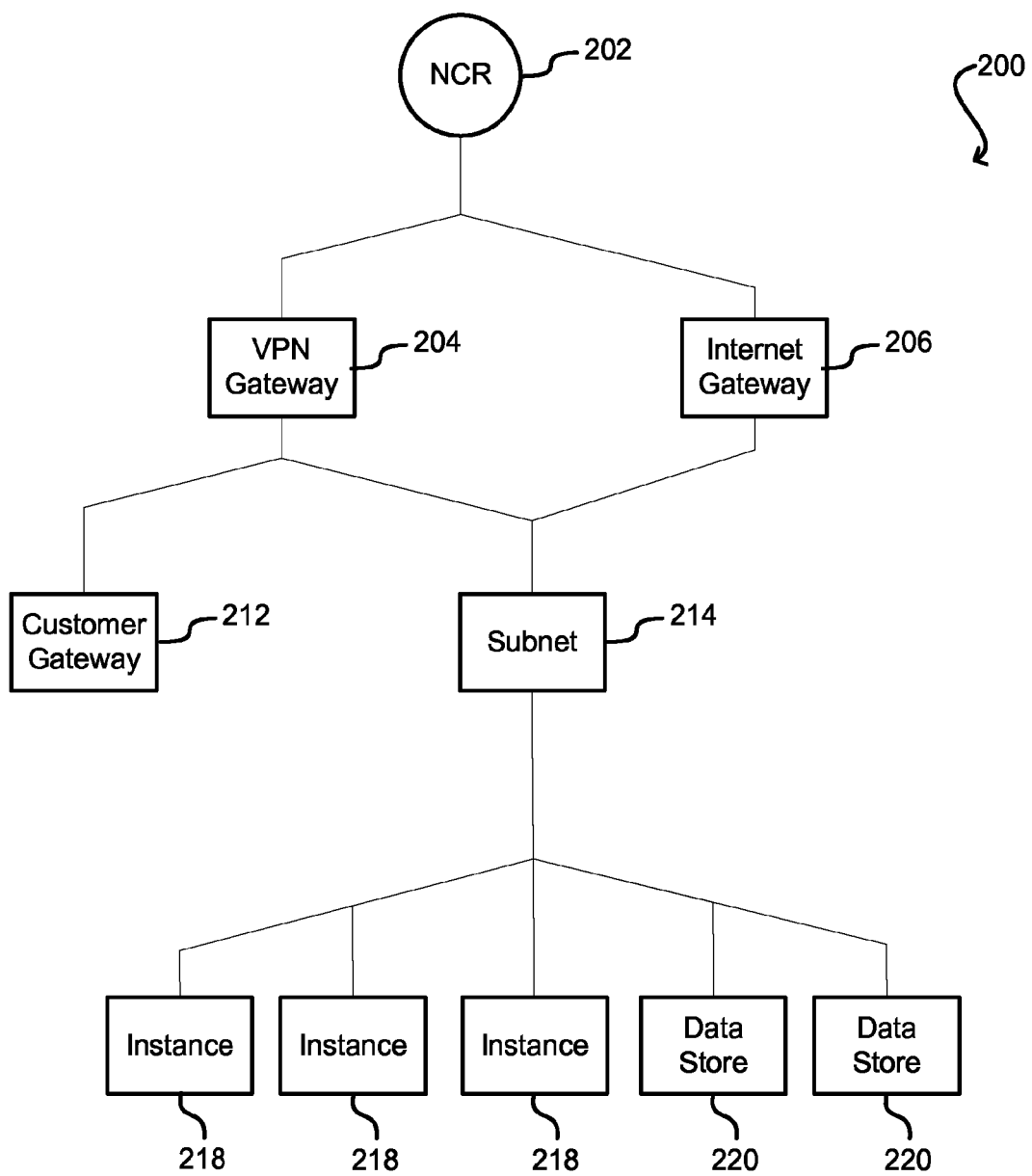
FIG. 2 shows an illustrative example of a distributed computer system snapshot broken down into nodes in accordance with at least one embodiment.

The structure of computing resources in a network of computing resources as shown in FIG. 1 may also be represented as nodes in a set. In FIG. 2, a set of nodes 200 is shown as a directed acyclic graph ("DAG") with the nodes representing computing resources within the hierarchy described in relation to FIG. 1. The lower computing resources may depend on the upper resources. By representing the computing resources as a DAG, the computing resources may be easily stored in a snapshot in an organized manner. During a snapshot storing procedure, dependencies may not be important and so the DAG may be traversed in an orderly manner to store selected data from each node in a snapshot.

In one embodiment, a parent computing resource is stored before a child computing resource while noting any dependencies. For example, a network of computing resources node 202 may be stored before nodes such as a virtual private network (VPN) gateway 204 or internet gateway 206 may be stored. A customer gateway node 212 or subnet 214 may be stored and noted as dependent on a VPN gateway 204 creation, as they may be dependent on the VPN gateway routing configuration. Instances 218 and data stores 220 may be stored with noted dependencies on a subnet 214 for network configuration.

While an example of computing resources and their hierarchy has been shown in FIGS. 1 and 2, it should be recognized that other hierarchies and computing resource definitions may be used. For example, the computing resources may be organized as a tree instead of a DAG. A tree may be useful in snapshot creation, as peer and other dependencies may not need to be respected at the time of snapshot. In contrast, during instantiation, dependencies may be important, such that a data structure representing dependencies may be created to order the instantiation of computing resources. In some embodiments, the DAG of nodes may include more granular information down to a desired component or module. In one embodiment, block storage devices may be included as child nodes of instances 218.

While a DAG has been shown as a set, other sets and relationships may also be used. In one embodiment, relationships or links may represent connectivity. For example, an instance 218 may have connectivity to a data store 220, subnet 214 and internet gateway 206 represented by links in a graph type of set. In another example, an instance 218 relationship with a subnet 214 may represent that the subnet 214 services the instance. In another embodiment, relationships or links may represent dependencies. The dependencies may form a directed acyclic graph or DAG, such that one resource with dependencies may be provisioned after the dependencies are provisioned.

It should be recognized that networks of computing resources may include virtualized and non-virtualized resources. In some embodiments, no virtualized resources are used. For example, in some embodiments, a computing resource may include an operating system on a physical machine without a hypervisor. In other embodiments, virtualized resources are used. For example, in some embodiments, a computing resource, may include a guest operating system managed by a hypervisor on a physical machine. These resources may exist in a data plane, which may be managed by a control plane.

Various embodiments provide a separate control environment, or control plane, that may be used to monitor and/or control aspects of a data environment, or data plane. The functionality of a control plane may be provided as a set of Web services, for example, enabling the control plane to act as a virtual administrator. A user may submit a request to the control plane through an externally-visible application programming interface (API), for example, which may be analyzed to determine actions to be performed in the data plane, such as actions that create, delete, prepare a snapshot, instantiate a snapshot or otherwise operate on computing resources. State information may be passed to a component of the data plane for each task necessary to perform the action, such that the control plane may manage the performance of the tasks without having direct access into the components of the data plane. Once provisioned or instantiated, a user may have native access to the computing resources in the data plane.

Figure 3:
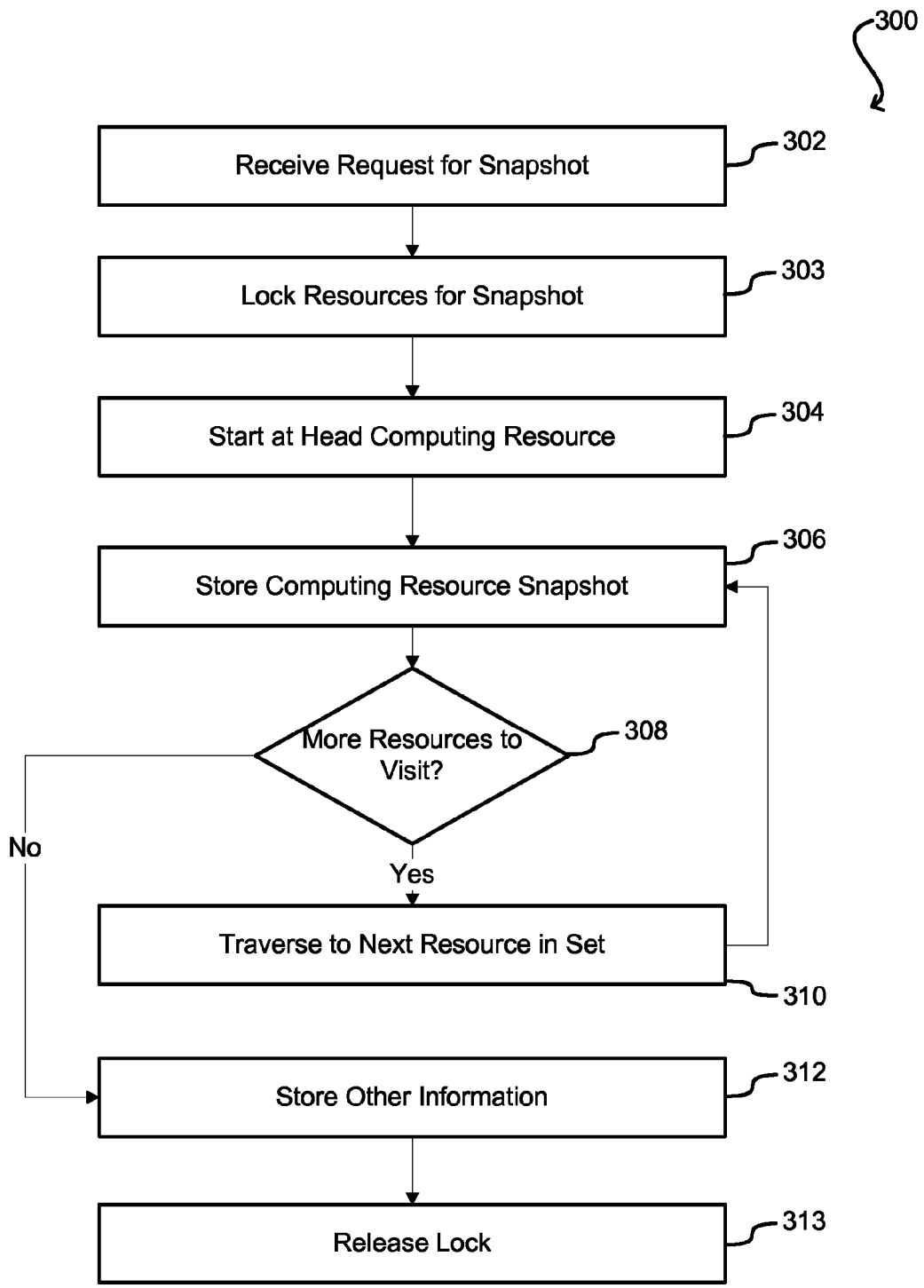
FIG. 3 shows an illustrative example of a process that may be used to take a snapshot of a distributed computer system at a point in time in accordance with at least one embodiment.

The set of nodes 200 may be used to aid in the taking of a snapshot, such as in a process of preparing a snapshot 300 outlined in FIG. 3. In one embodiment, a control plane requests a snapshot of information within a data plane having a network of computing resources. After the snapshot request is received 302, the control plane may determine resources related to the network of computing resources that should be notified and locked 303 pending the snapshot. The locking of the resources to a certain state in time may allow the snapshot to retain consistency. The head computing resource of a set may be located 304 and selected. Information from the selected computing resource may then be stored 306. If further computing resources exist 308 in the set, the next computing resource may be located 310, selected and reviewed in order to have the next computing-resource information stored 306. If not 308, any remaining information may be stored, which may include meta information such as time and date of the snapshot, types of information stored, versions and other information about the snapshot and system configurations. Once complete, the resources may be released from the requested lock. Examples of storing a snapshot may be seen in U.S. Non-Provisional application Ser. No. 13/070,812, which is incorporated by reference above. In various embodiments, the resources may journal activity that modifies the resource during the lock period. After the lock is released, the journal may be applied to update the resource. The computing resources may be prevented from being modified until the snapshot is complete. Changed entries may be marked as "dirty" with the original data available to roll back the "dirty" entries.

The set of nodes may be traversed such that an underlying computing resource may be reviewed for computing resource data to store in a snapshot. The computing resource data gathered may be stored in an order that is useful for provisioning resources from the snapshot. In some embodiments, the traversal may be through preorder, post-order or in-order traversal methodologies. For example, in a tree, if a parent node is required to be constructed before any child nodes may be constructed, a preorder traversal may be useful. In a preorder construction the parent may be visited and the parent portion of the snapshot constructed before child nodes are visited. In other embodiments, a post-order traversal may be useful to construct the child node portion of the snapshot before the parent node portion. In other embodiments, such as embodiments that contain peer dependencies, an initial tree traversal may be used to create a dependency graph, such as a DAG, and the dependency graph followed in creating the snapshot. The dependency graph may ensure that resources are stored in an order that respects dependencies when re-instantiated. This may provide the advantage of speeding up the process of instantiation, as dependencies are prepared at the time of the snapshot.

For example, the DAG in FIG. 2 may be used to prepare a snapshot in the following manner. The head node, a network of computing resources node, 202 is visited and its information is stored. The network of computing resources information may include settings, default values and organizational information about the network of computing resources information. The VPN Gateway 204, then Customer Gateway 212 are visited and their information stored within the snapshot. Gateway information may include routing and security information. The subnet 214 is then stored followed by the instances 218 and data stores 220. Subnet information may include addressing and connectivity information. Instance information may include operating system images, software, and other processing information. Data stores may include schema, databases, files and other storage information. Then the internet gateway 206 may then be stored. Internet gateway information may include routing, port settings and security information. After which, the snapshot may be complete. It should be noted that computing resources include both computing systems, such as instances and data stores, and network resources, such as gateways and subnets. In some embodiments, the computing resources correspond to physical objects, such as a router and/or a server. In other embodiments, the object may be conceptual, such that configurations may correspond to entries within a larger system.

Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 4:
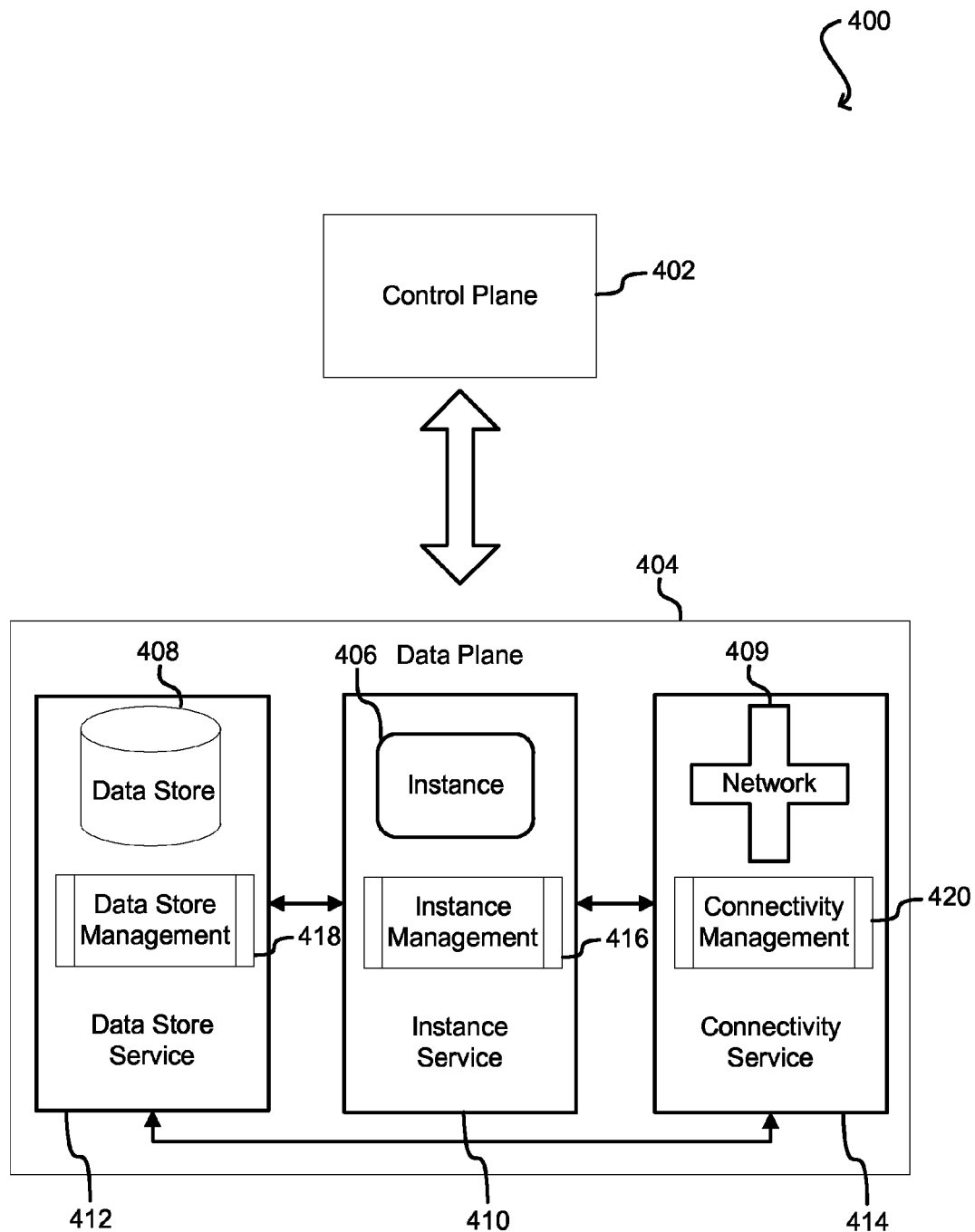
FIG. 4 shows an illustrative example of a control system for processing a distributed computer system snapshot and instantiate procedure in accordance with at least one embodiment.

In some embodiments, the computing resources may have associated services to aid in taking and instantiating snapshots. A distributed computer management system 400 with such services may be seen in FIG. 4. A control plane 402 communicates with a data plane 404. The control plane 402 may include application programming interface (API) access, web service access and other manual or programmatic access. The control plane 402 may allow for security, encapsulation and simplification of tasks communicated to the data plane 404. For example, a user may request to instantiate an instance 406 and data store 408 at the control plane 402. The control plane 402 may contact the data plane or, in some cases, the correct services directly and provide instructions on the creation of each instance 406 and data store 408 requested. The control plane may then report back the status of the instance and data store.

The data plane may contain computing resources 406, 408, 409 and services 410, 412, 414 to support the computing resources. Each service 410, 412, 414 may contain management logic 416, 418, 420 to support the service and an API to access the service. Part of the management logic may include instructions to prepare or instantiate a snapshot of the computing resource. For example, the control plane 402 may receive a request to prepare a snapshot of an instance 406. The control plane may contact the data plane or instance service 410 and request the snapshot of the instance be performed. The instance management logic 416 may determine the information to store in the snapshot, request storage for the snapshot and perform the snapshot procedure. The management logic 416 may also report the status to the control plane 402 as complete, when the snapshot is complete, as well as disclose the location of the snapshot. The services 410, 412, 414 may also be linked, such that information or requests may be shared. In one embodiment, an instance management logic 416 may request storage for the snapshot from a data store service 412. In some embodiments, third party services may implement the API as well. The third party services may then notify the control plane to register as a supported service, such that the service may be called during snapshot or instantiation procedures.

The control plane 402 and/or data plane 404 may use these services in performing distributed computing system snapshots. When requested to prepare a snapshot of the network of computing resources, the control plane may request that each service associated with a computing resource in the tree prepares a snapshot. The control plane can then aggregate and/or link the snapshots. Computing resources that depend on other computing resources may request a snapshot of the other computing resources when a snapshot of that particular computing resource is requested, and reference the snapshot of the other computing resources. For example, a control plane 402 may receive a request for a snapshot of an identified subnet computing resource. The control plane 402 may request that the data plane 404 prepare a snapshot of the subnet computing resource. The data plane 404 may contact the network service 414 and request a snapshot of the subnet computing resource. The connectivity management logic 420 may prepare a snapshot of the subnet computing resource and in so doing, discover an instance 406 and a data store 408 related to the subnet computing resource. The connectivity management logic 420 may then contact the instance service 410 and data store service 412 and a request a snapshot of each. When complete, the instance service 410 and data store service 412 may return a reference of their new prepared snapshots to the connectivity management logic 406. The connectivity management logic 406 may aggregate the snapshots and return a reference of the aggregation to the data plane 404, which may return the reference to the control plane 402.

The snapshots may be aggregated in any of several different ways. In one embodiment, the snapshots are aggregated as one image, such that a snapshot is contained in one or more files grouped together. In another embodiment, the snapshots are aggregated as a reference layout. The individual computing resource snapshots may be managed by their respective services, but the individual computing resource snapshots may contain links or references to other related individual computing resource snapshots. For example, the subnet snapshot described above may contain the timestamp and identification reference of the instance and data store snapshots. In another embodiment, the snapshots may be convertible from an image to a reference layout. For example, a user may request a snapshot as an image to place into less expensive storage, such as a long-term backup service. If the snapshot is useful in the future, the user may request the image snapshot be broken into individual computing resource snapshots which may be stored within the various relevant services. In this way, the services may be prepared to instantiate the snapshot in a shorter period of time. This priority storage may provide advantages, including versioning of snapshots. The current stable version may be available for a more rapid instantiation in a reference layout, while an image may be useful for previous versions that may be more slowly instantiated.

Figure 5:
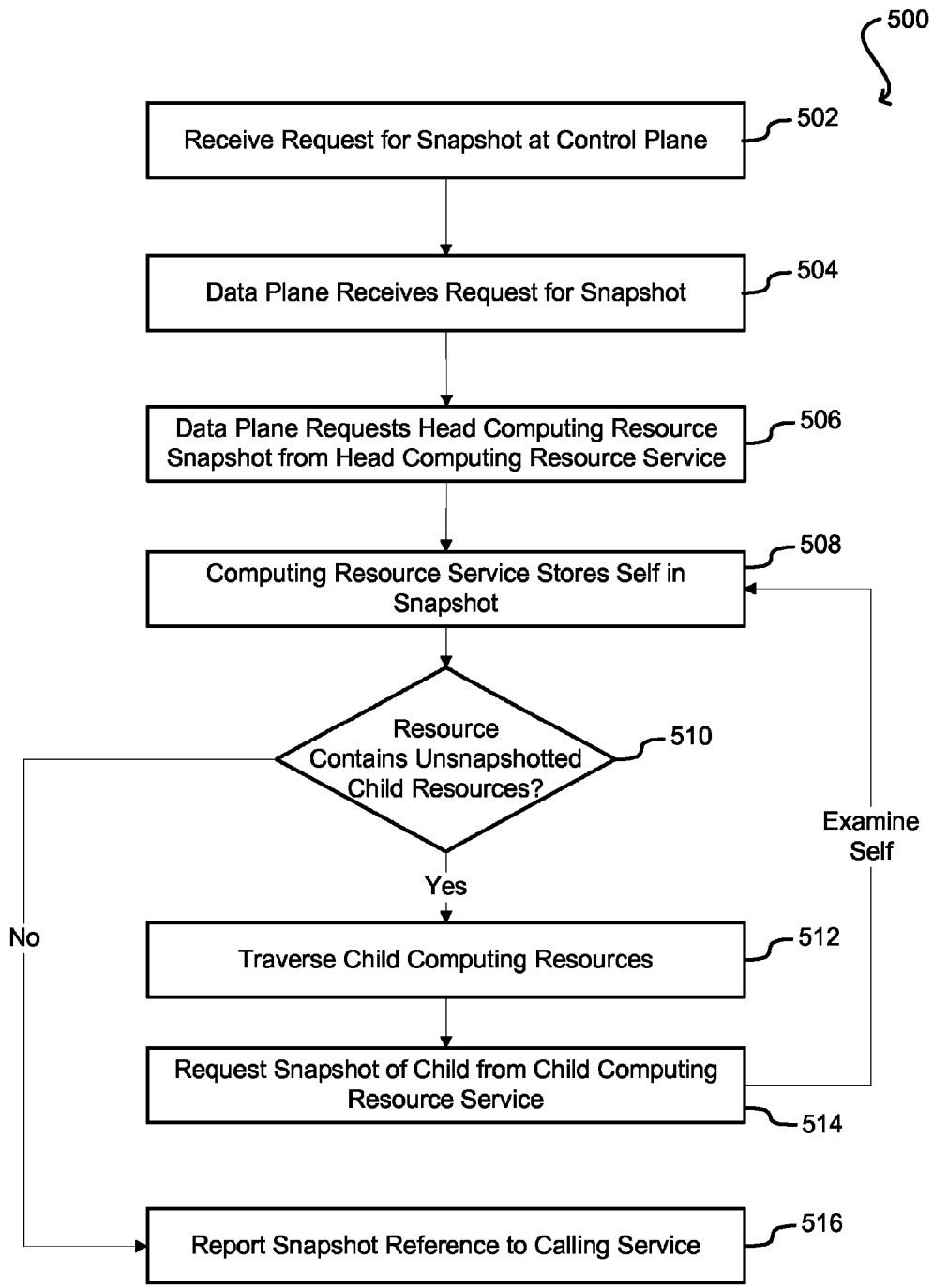
FIG. 5 shows an illustrative example of a process that may be used to prepare a snapshot in a distributed computer system with management services in accordance with at least one embodiment.

An example of a method of preparing a distributed computer system snapshot in a service environment 500 may be seen in FIG. 5. A control plane may receive a request 502 for a snapshot of a distributed computer system. The control plane may request 504 a snapshot of the distributed computer system from data plane and a lock to prevent changes to the computing resources during the snapshot. The data plane may request 506 a snapshot of the head computing resource of the distributed computer system from the service associated with the head computing resource. The computing resource service may then perform 508 a snapshot procedure on the computing resource. If the computing resource service discovers unsnapshotted child computing resources 510, the computing resource service may traverse 512 each child computing resource and request 516 a snapshot from each child service associated with the child computing resource. An unsnapshotted child computing resource may include resources that do not have a current snapshot available, such as computing resources that have never had a snapshot taken or computing resources that have an out of date snapshot. If there were no further unsnapshotted child computing resources 510, the computing resource service may aggregate child snapshots with the current computing resource snapshot and return 516 a snapshot reference to the calling service. The snapshot reference may include a reference to the underlying aggregated snapshot. As each service returns a snapshot reference, eventually the process will return to the head node returning an aggregated snapshot reference to the control plane. When the control plane receives a reference of the entire aggregated snapshot, the control plane may archive the aggregated snapshot and release any acquired lock. In some embodiments, the lock may be released for each resource after the resource has a current snapshot taken. In some alternative embodiments, the control plane may contact the services directly rather than through a data plane management layer.

In an alternative embodiment, the control plane may also traverse the set of computing resources to construct a dependency structure, such as a DAG. Using the dependency structure such that independent computing resources in the snapshot are stored before dependent resources, a snapshot may be created that allows for an in-order instantiation of the stored resources, as shown in FIG. 6.

Figure 6:
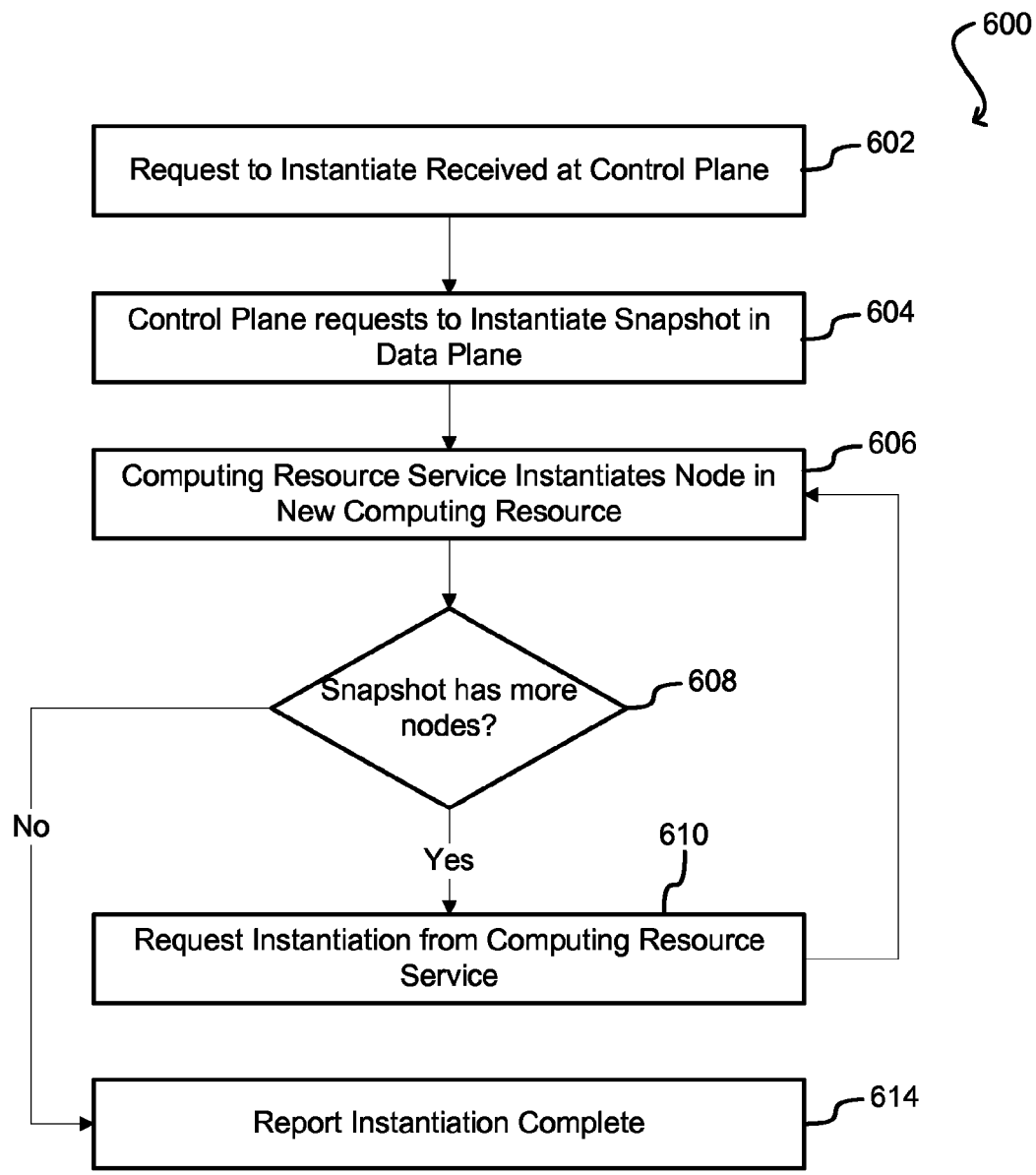
FIG. 6 shows an illustrative example of a process that may be used to instantiate a snapshot in a distributed computer system with management services in accordance with at least one embodiment.

An example of a method of instantiating a distributed computer system snapshot ordered for dependency in a service environment 600 may be seen in FIG. 6. A control plane may receive 602 a request to instantiate a snapshot. The control plane may, in turn, request 604 that the data plane instantiate the snapshot. The data plane may select a first node from the snapshot and request the node be instantiated 606 from a service associated with the type of computing resource represented by the node. If the snapshot contains 608 remaining nodes, the next node may be requested to be instantiated 610. Services associated with computing resources represented by each node may be contacted and requested to instantiate the next node of the snapshot. If no more nodes are contained 608 in the snapshot, the computing resource service may report 614 the instantiation as complete to the requesting service. As each service reports the instantiation process as complete, the control plane may eventually receive an instantiation complete message. In some embodiments, after the instantiation is complete, the control plane may start the associated services and activate the distributed computing system in the order contained within the snapshot.

In some cases, the snapshot may not be ordered for dependency as seen in FIG. 6. In these embodiments, the dependency graph may need to be built first and the dependency graph used in ordering the provisioning of the computing resources represented by nodes within the snapshot. However, once the order is determined, some embodiments proceed as in FIG. 6 with the determined order.

Figure 7:
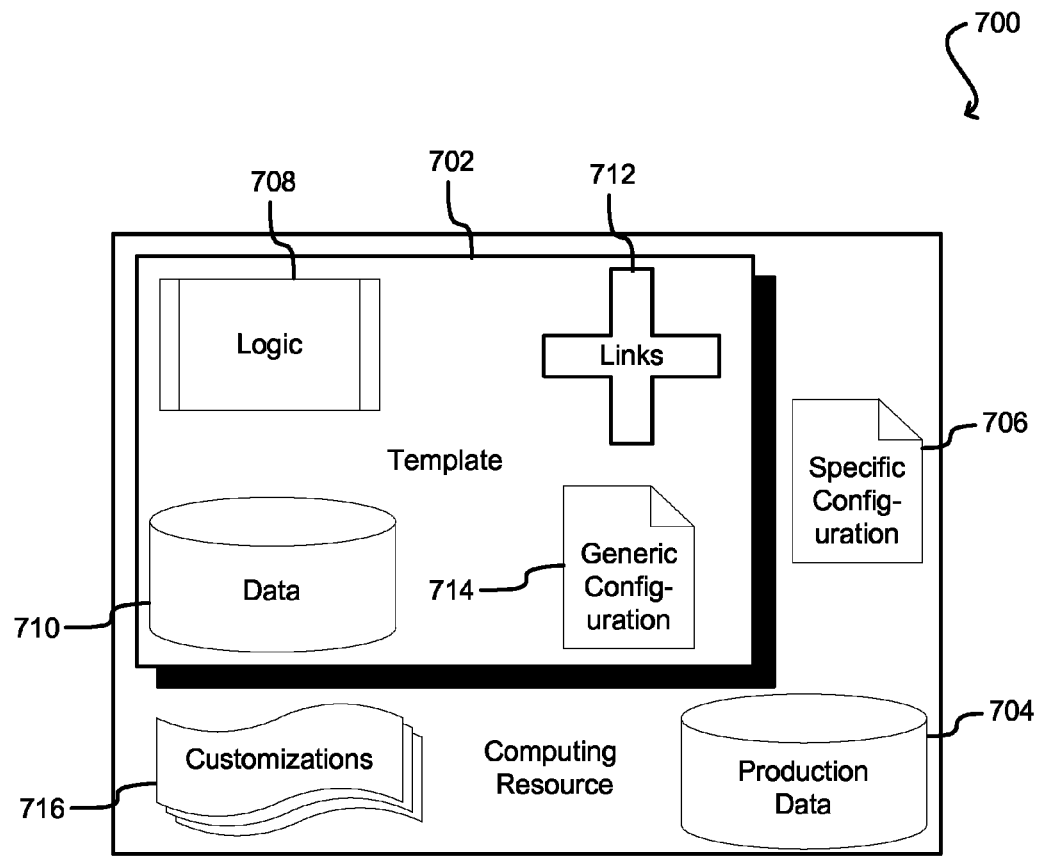
FIG. 7 shows an illustrative example of a computing resource with different types of information in accordance with at least one embodiment.

Data within computing resource objects or nodes may be further classified as seen in FIG. 7. In some embodiments, the data in a computing resource node 700 is classified as template data 702, production data 704 and configuration data 706. Template data may include information that represents the structure and operation of the distributed computing system. For example, template data may include logic 708, data definitions 710 such as database table definitions, generic routing information such as links to other computing resources 712, and generic configurations 714 such as operating system configurations and application files. Production data 704 may include information generated and obtained in connection with a particular application. Production data 704 may include user data, administrative information and other information useful to the operation of a distributed computing system, such as a web service. Configuration data 706 may include information about a specific configuration of a distributed computing system. Configuration data 706 may include specific IP addresses, computing resource identification numbers, data center configuration files and other specifics about the distributed computing system as it operates in its current environment.

Types of data may be combined in a snapshot. In some cases, combinations of data may be referred to as a depth of data. For example, storing template data alone may be referred to as a shallow depth, because, in some embodiments, only the network of computing resources structure may be reproduced. A normal snapshot may include the template data and the production data. A deep snapshot may represent template data, production data and configuration data. In some embodiments, the system or the user may identify each type or depth of data. For example, some data may be implicitly identified by the system, such as database schema is likely part of the template data. Other data may be explicitly marked by a user, such as a database table of system configurations marked as template data.

In other embodiments, there may be alternatives stored with the snapshots. For example, a template may include different options or customizations 716. In some cases, the options or customizations may be mutually exclusive and therefore only one customization may be instantiated. For example, production data alternatives may include live data and testing data. The user may select to instantiate either, or sometimes both, production data set.

The snapshots may be used to checkpoint and restore a distributed computing environment to dates and times in the past, while reducing redundancy and increasing speed. In an embodiment, template data may not change frequently. A template snapshot may thus provide a base for multiple production data and configuration data snapshots. Thus a snapshot may include metadata that specifies snapshots to join together which will form a complete snapshot of a specified period in the past. Similarly, if data has not changed since a last snapshot, such as computing resource template data, the computing resource may return the prior snapshot as a current snapshot. By returning the prior snapshot, time, space and computing resources may be saved.

In some embodiments, configuration data may be stored with the template using generic identifiers. The generic identifiers may identify information that should be configured upon instantiation while noting important information. For example, a subnet may include an IP address range, with an instance and a data store each having an IP address. The IP address range and individual IP addresses may be noted as related and references to the ranges stored as generic identifiers. The generic identifiers may then be used to ensure that the instance and data store each receive an IP address within the subnet when instantiated, even if the IP address range is different.

Figure 8:
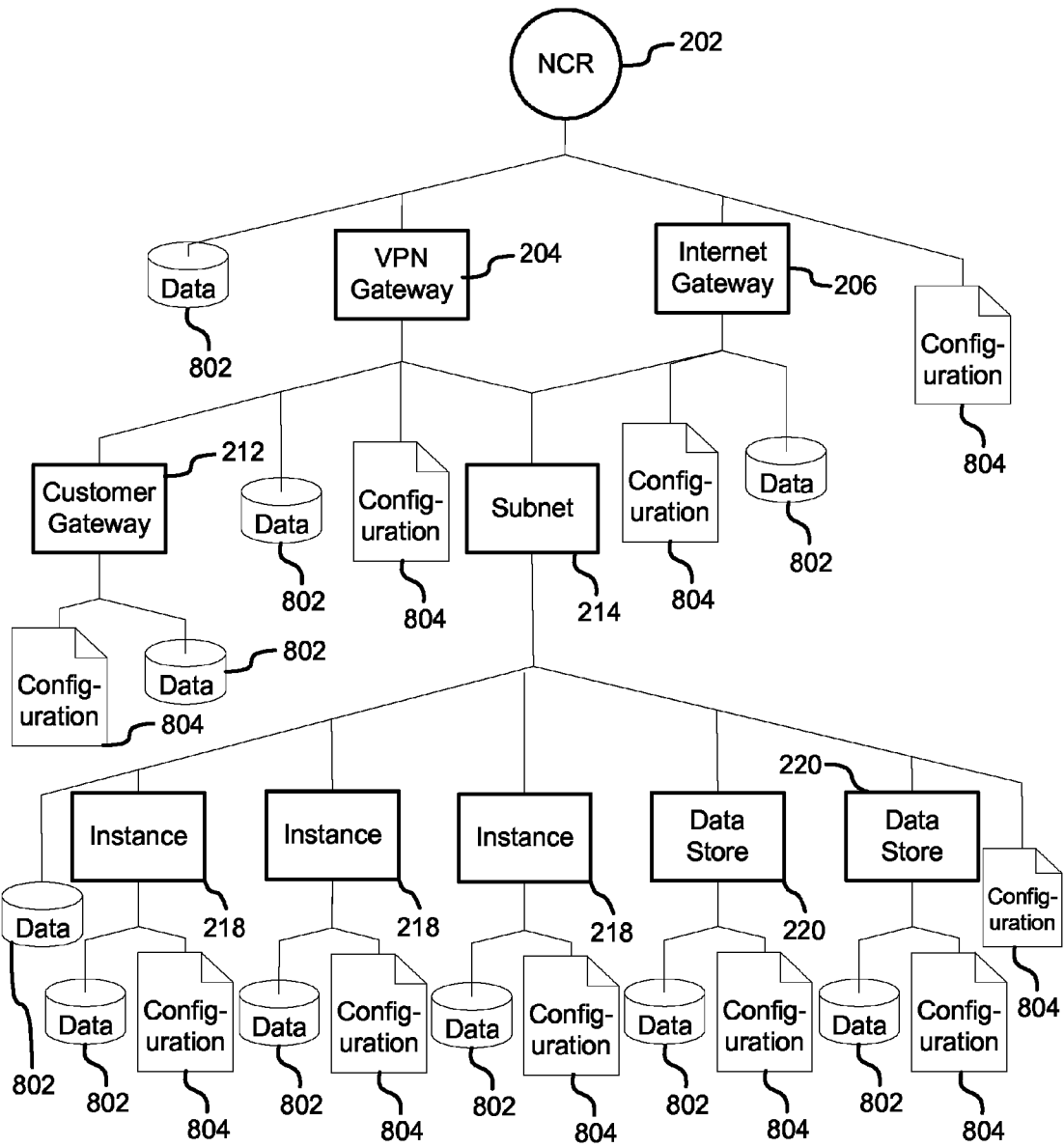
FIG. 8 shows an illustrative example of a distributed computer system snapshot broken down into node types in accordance with at least one embodiment.

In some embodiments, nodes may represent types of data as seen in FIG. 8. FIG. 8 includes the nodes discussed in FIG. 2 with types of data broken into separate nodes. Template nodes may include the NCR 202, VPN Gateway 204, Internet Gateway 206, Customer Gateway 212, Subnet 214, Instance 218 and Data Store 220 nodes. Each template node may represent a computing resource at a shallow depth. Further information, such as production data and configuration data, may be represented as production data nodes 802 and configuration data nodes 804 below the template node.

When traversing a computing resource DAG to instantiate or store a snapshot, only nodes corresponding to information to be stored for the snapshot need to be visited. In some embodiments the selected data depth may dictate the nodes instantiated or stored. For example, an instantiation service instantiating a template snapshot may not need to visit production data nodes 802 or configuration data nodes 804. In other embodiments, generic identifiers may be constructed for template snapshot instantiations from data contained within the production and/or configuration data nodes. In other embodiments, only portions of a cloud may be selected to snapshot. For example, an administrator may only wish to store direct ancestors and descendants of a specific subnet which contains the functionality of a website service. Other subnets may be irrelevant to the main functionality and therefore undesirable. In some embodiments the user may select which nodes to snapshot. In other embodiments, the system may programmatically select which nodes to instantiate or store. In other embodiments, the set of nodes may be instantiated or stored through parallel processing rather than sequential processing by allowing for a process per branch approach. In some embodiments, a selected data snapshot may be referred to as a type of snapshot. For example, the snapshot may be described as a template snapshot for template data; production snapshot for production and template data; and a configuration snapshot for template, production and configuration data.

Figure 9:
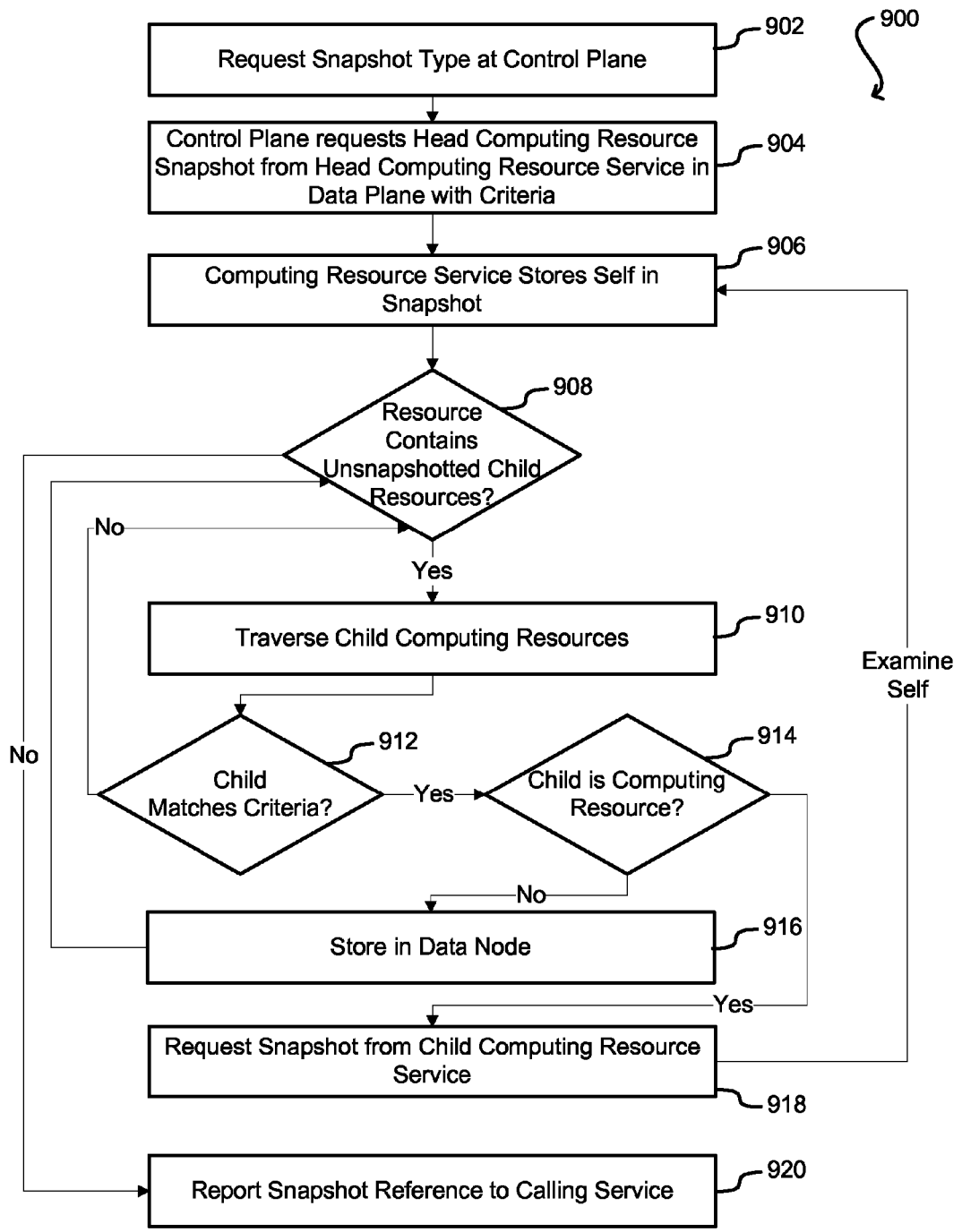
FIG. 9 shows an illustrative example of a node type aware process that may be used to prepare a snapshot in a distributed computer system with management services in accordance with at least one embodiment.

An example of a parallel executing method in a distributed computing system that programmatically selects nodes to store in a snapshot is shown in FIG. 9. A request for a type of snapshot is received 902 by the control plane. The type of snapshot may impose criteria on the storing of snapshot information. For example, if a template snapshot is selected, the criteria may cause only template data (and/or data marked as template information in metadata) to be stored in the snapshot. The control plane contacts the data plane and requests 902 a type of snapshot starting with a head computing resource. The computing resource is stored in a snapshot 904. If the computing resource contains 908 child computing resources, or has child nodes depending on one's view, each child may be visited 910 by a process and their snapshots aggregated. If not 908, the computing resource may return 920 a reference to the current aggregated snapshot. If the child is included 912 in the snapshot criteria, and the child is a computing resource 914, the associated child computing resource service may be requested 918 to prepare 906 a snapshot of the child computing resource. If the child is included 912 in the snapshot criteria, but the child is not a computing resource 914, the information may be stored in a data node, the reference to the node stored by the current computing resource. The computing resource may then check 908 for further unsnapshotted child resources. If the child is not included 912 in the snapshot criteria, the computing resource may then continue to check 908 for further unsnapshotted child resources. After all child resources have been visited and reviewed for the snapshot and no further unsnapshotted or unreviewed child resources remain 908, the child computing resource may report 920 the child snapshot reference to the calling service. After all requests to child services have completed and a snapshot reference has been returned to the control plane, the control plane may store the reference to the aggregated snapshot.

Figure 10:
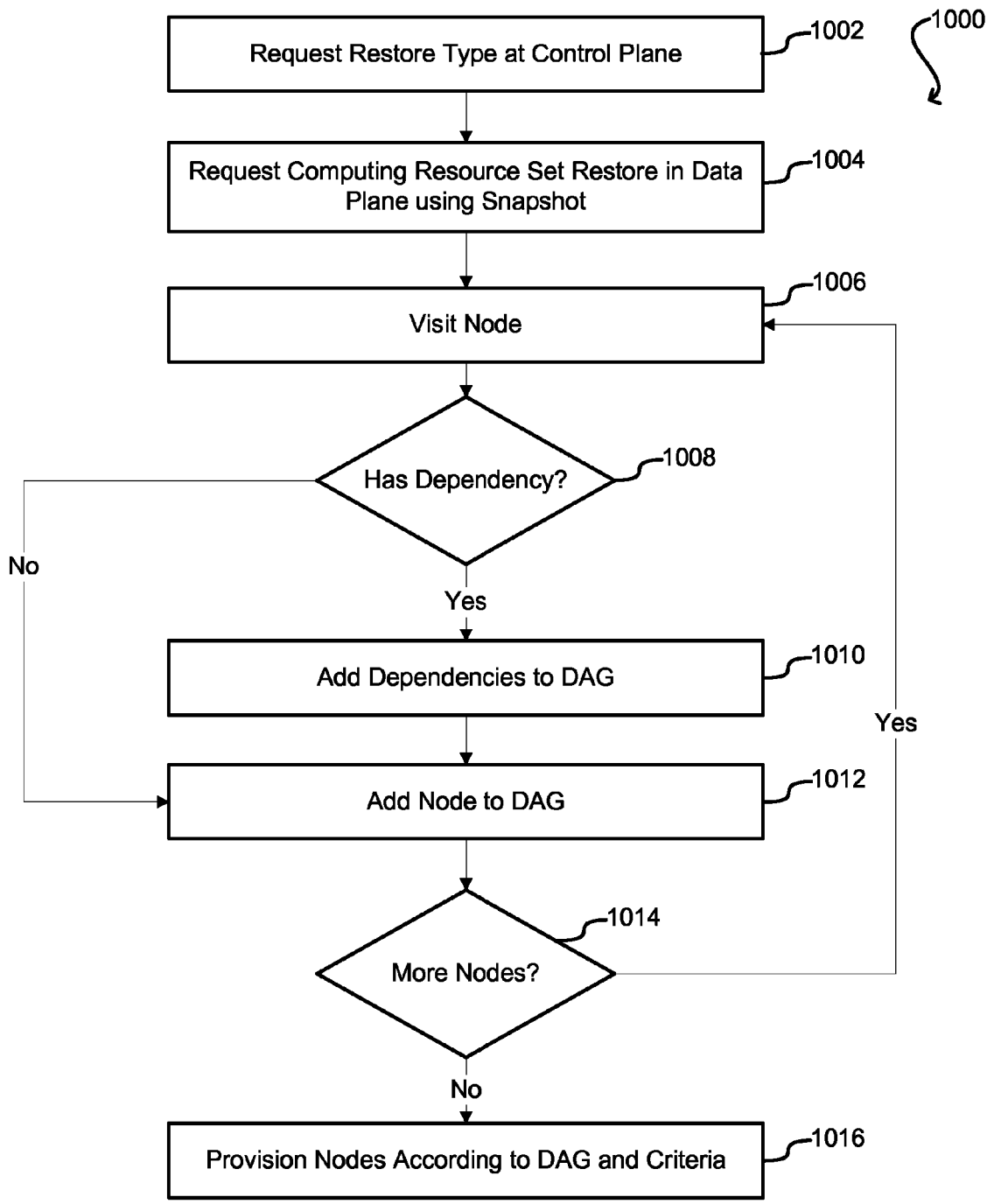
FIG. 10 shows an illustrative example of a node type aware process that may be used to instantiate a snapshot in a distributed computer system with management services in accordance with at least one embodiment.

An example of a method in a distributed computing system that programmatically selects nodes to instantiate from a snapshot is shown in FIG. 10. In one embodiment, a control plane may request a data plane instantiate a network of computing resources using a desired snapshot and level of instantiation (such as a template instantiation of the snapshot). The level of instantiation may include criteria, such that only computing resources and/or information that meet the criteria will be instantiated. A request to restore a level of instantiation is received 1002 at the control plane. The data plane then receives 1004 a request to restore a network of computing resources using a snapshot. In the event that dependencies between nodes must be respected, nodes within the snapshot may be visited. As each node is visited 1006, the nodes may be reviewed for dependency information 1008. The dependency information may be implicit to the node, such as a data store requiring a subnet, or explicitly stated, such as an instance stating in its metadata that it is dependent on a data store. Any dependencies 1010 may be added to a dependency structure, such as a DAG or table of dependencies. The node itself 1012 may then be added to a DAG or list of structures to restore. If more nodes are 1014 within the snapshot, those nodes may also be visited 1006 for dependencies. The dependency structure may then be used 1016 to visit each node for provisioning. As each node is visited, the level of instantiation, and its criteria, may be used to determine whether to instantiate the node as a computing resource and which data to include in the instantiation.

By simplifying the snapshot procedure and providing template snapshots, the snapshots may be used to provide others with copies of a distributed computer system template. In one embodiment, a snapshot of a live system may be used to bring up a second distributed computer system for a testing environment. In another embodiment, a snapshot may be used to create a template system for a second distributed computing based on the same core functionality. For example, an e-book-seller may desire to bring up a second service to sell digital music using the same technology as the e-books. In an embodiment, a user may offer a template instantiation of a snapshot for sale in an electronic marketplace.

Figure 11:
FIG. 11 shows an illustrative example of a electronic marketplace offering distributed computer snapshots in accordance with at least one embodiment.

An example of electronic marketplace 1100 to purchase distributed computer system templates is shown in FIG. 11. The electronic marketplace 1100 may be displayed via a web page displayed on a web browser interface 1102. The web page illustrated in FIG. 11 includes a result pane 1104 on the right-hand side of the web page and a refinement pane 1106 on the left-hand side of the web page. In this example, the result pane 1104 includes an ordered set of search results, where a search result may be a representation of a template. The search results illustrated in FIG. 11 may have been identified as responsive to a search query submitted by a user. For instance, in this example, the web page includes a search box 1108 that illustrates a search query that the user has submitted. In this example, as illustrated, the user has submitted a search query for "websites for purchase." Accordingly, FIG. 11 illustrates the search results in the result pane 1104 as corresponding to various templates of distributed computing systems that support websites that are available for purchase.

Once purchased, the electronic marketplace may contact a control plane and give permission to the purchasing user to access a instantiation function of the snapshot. Depending on the purchase, the control may give permission to a depth or level of snapshot instantiation. For example, a purchase may be for a template depth or level of snapshot instantiation. Depending on the settings, the user may be able to update from future snapshots, or be limited to the snapshot purchased. The electronic marketplace may share the income with the seller, which may include a one-time payment and/or recurring payments based on the purchase and usage of systems instantiated from the snapshot. The seller may continue to pay for the storage of the snapshot, while purchasers of the snapshot may pay for the instantiated computing resources. In one embodiment, a purchaser may request that the snapshot merge with current active resources rather than create new resources. For example a purchaser may request that the purchased subnet merge with a currently active subnet. Similarly, other resources may be merged, such as two databases.

In an embodiment, the system may be used to transfer control of a distributed computing system to another user. The distributed computing system owner may arrange a sale of the distributed computing system to a new owner. Once the purchase is completed, the control plane may prepare a snapshot of the distributed computing system. Once the snapshot is complete, the control plane may instantiate the snapshot in the purchaser's account. The old distributed computing system from the seller's account may then be taken down, as the new one is activated and takes its place. An advantage of this transfer method is that a snapshot is made at the time of sale, which may provide peace of mind and protection in the case of future misconfigurations by the purchaser. In one embodiment, the migration operation may instantiate each computing resource after its snapshot is taken. This might provide the advantage of a faster transfer, as the full snapshot is not required before instantiation of the transferred resource.

Portions of snapshots may also be purchased to add functionality to current distributed computing services. For example, a website owner may desire to add video hosting to their current offerings. A video hosting template snapshot may be selected and instantiated into the owner's distributed computing system or cloud. If the video hosting should be protected by Digital Rights Management (DRM), the user may also purchase a DRM snapshot to add to the distributed computing system. The DRM computing resources may then be configured to connect to the video hosting computing resources, such that the video rights may be digitally managed on the website. More specifically, the DRM snapshot may contain an NCR node, subnet node and a set of computing resources in the subnet. The website owner may select to merge the NCR and subnet with an active NCR and an active subnet. The computing resources, however, may be configured to instantiate within the active subnet. Thus, a website owner may configure how the snapshot is merged and/or instantiated with an active NCR.

Figure 12:
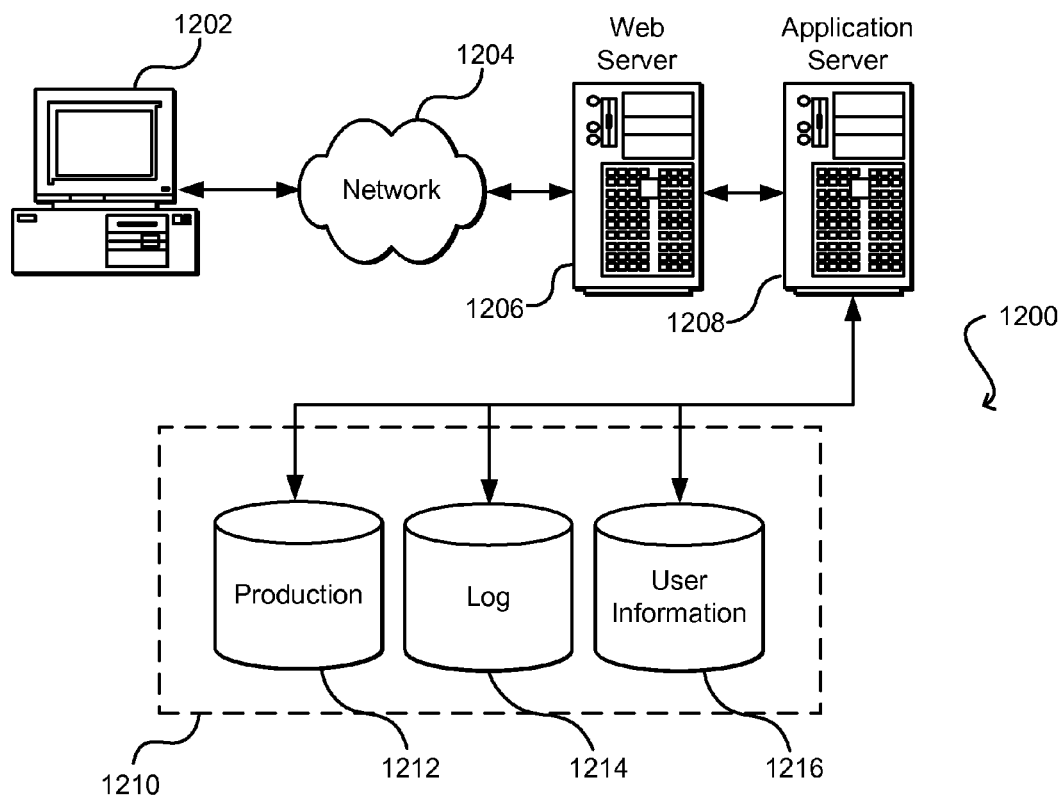
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

For the Examiner's convenience, Applicants note that this application is a continuation of U.S. Pat. No. 8,543,547 and incorporates by reference U.S. application Ser. No. 13/070,812, filed on Mar. 24, 2011, titled "Replication of Machine Instances in a Computing Environment". The claims of the present application are different and possibly, at least in some aspects, broader in scope than the claims pursued in the parent application. To the extent any prior amendments or characterizations of the scope of any claim of the parent or any cited documents could be construed as a disclaimer of any subject matter supported by the present disclosure, Applicants hereby rescind and retract such disclaimer. Accordingly, the references previously presented in the parent applications may need to be revisited.

What is claimed is:

1. A computer-implemented method for performing a snapshot representation of a distributed computing environment at a point in time, the method comprising:
   under control of one or more computer systems configured with executable instructions,
      traversing a set of computing resources in the distributed computing environment, the set of computing resources forming a hierarchy wherein each node in the hierarchy represents a computing resource of the set of computing resources;
      determining depth information including a snapshot level of the hierarchy in the distributed computing environment to store in a snapshot, the snapshot level corresponding to a subset of nodes in the hierarchy to store in the snapshot;
      marking a portion of at least one computing resource of the set of computing resources as a template portion of the snapshot, the template portion of the snapshot indicating how to replicate a structure of the distributed computing environment; and
      preparing the snapshot based at least in part on the marked template portion of the snapshot and the determined depth information, the snapshot including a set of stored nodes representing the structure of the distributed computing environment, each stored node configured to store information from the set of computing resources.

2. The computer-implemented method of claim 1, further comprising:
   receiving a request to instantiate at least a portion of the distributed computing environment with an instantiation level of the hierarchy;
   for each stored node within the instantiation level of the hierarchy and portion of the distributed computing environment,
      determining dependencies between the stored node and other stored nodes;
      storing the dependencies in a data structure for use during provisioning; and
   using the data structure to instantiate computing resources from stored nodes within the instantiation level of hierarchy, the instantiation performed in an order that respects dependencies between computing resources stored in the stored nodes, the computing resources receiving snapshot information within the instantiation level of the hierarchy from data associated with the stored nodes; and
   instantiating a replica of at least a portion of the distributed computing environment represented by the snapshot.

3. The computer-implemented method of claim 2, wherein the stored nodes further comprise one or more data nodes, the computer-implemented method further comprising:
   loading data from a data node to an instantiated computing resource based at least in part on a computing-resource stored node linked to the data node in the snapshot, the instantiated computing resource having been created from the computing-resource stored node.

4. The computer-implemented method of claim 3, wherein at least one of the one or more data nodes include configuration information for the instantiated computing resource, the computer-implemented method further comprising:
   selectively loading the configuration information from the at least one data node into the instantiated computing resource based at least in part on the instantiation level of the hierarchy.

5. The computer-implemented method of claim 3, wherein the stored nodes further comprise one or more configuration nodes, the computer-implemented method further comprising:
   selectively loading configuration information from a configuration node into the instantiated computing resource based at least in part on the instantiation level of the hierarchy, the configuration node linked to the computing-resource stored node.

6. A system for preparing a snapshot of a distributed computing environment at a point in time, comprising:
   at least one processor; and
   a memory including instructions that, when executed by the at least one processor, cause the system to prepare a snapshot of a distributed computing system by causing at least the following to be performed:
      receiving a request for a snapshot of a distributed computing environment, the distributed computing environment including one or more computing resources, the one or more computing resources forming a hierarchy wherein each node in the hierarchy represents a computing resource of the one or more computing resources;
      traversing at least part of the one or more computing resources to determine depth information including a snapshot level of the hierarchy in the distributed computing environment to store in the snapshot, the snapshot level corresponding to a subset of nodes in the hierarchy to store in the snapshot;
      marking a portion of at least one computing resource of the one or more computing resources as a template portion of the snapshot, the template portion of the snapshot indicating how to replicate a structure of the distributed computing environment; and preparing the snapshot based at least in part on the marked template portion of the snapshot and the determined depth information, the snapshot including a set of stored nodes representing the structure of the distributed computing environment wherein each stored node is configured to store information from the one or more computing resources.

7. The system of claim 6, wherein the instructions further include:

granting access to the template portion of the snapshot to a second user, the second user different than a first user, the system having received a request from the first user to prepare the snapshot; and restoring the template portion of the snapshot to the second user.

8. The system of claim 6, wherein the snapshot includes the template portion of the snapshot and production data.

9. The system of claim 6, wherein the snapshot includes the template portion of the snapshot, production data and configuration data.

10. The system of claim 9, wherein the instructions further include:

restoring the snapshot to a new distributed computing environment; and activating the new distributed computing environment in such a way as to not interfere with the distributed computing environment.

11. One or more non-transitory computer-readable storage media having collectively stored thereon executable instructions that, when executed by one or more processors of a computer system, cause the computer system to at least:

receiving a request to restore a snapshot of a network of computing resources according to one or more specified data selection parameters, the snapshot including a set of nodes representing a hierarchy of the network of computing resources;

traversing at least a portion of the set of nodes, at least one node forming a representation of a computing resource, in the snapshot to determine an order of instantiation, the order of instantiation based at least in part on determined depth information including a snapshot level of the hierarchy of the network of computing resources and at least a portion of at least one computing resource marked as a template portion of the snapshot, the snapshot level corresponding to a subset of nodes in the hierarchy to store in the snapshot, the template portion of the snapshot indicating how to replicate a structure of the network of computing resources; and restoring one or more representations to instantiate a replica of the network of computing resources represented in the snapshot according to the order of instantiation.

12. The one or more non-transitory computer-readable storage media of claim 11 further comprising:

causing one or more of the representations of computing resources to be provisioned according to the one or more specified data selection parameters and the order of instantiation, wherein one or more of the provisioned computing resources are selected from a group consisting of a network device, a computing device, and a data store.

13. The one or more non-transitory computer-readable storage media of claim 11, wherein restoring the one or more representations further comprises:

providing a service to manage a class of computing resources; and providing information from the snapshot to the service such that at least one of the computing resources is provisioned.

14. The one or more non-transitory computer-readable storage media of claim 11, wherein restoring the one or more representations further comprises:

receiving a value from a first user, the first user different from a second user, the snapshot associated with the second user; and restoring the snapshot for the first user.

15. The one or more non-transitory computer-readable storage media of claim 14, wherein the request to restore is received from the first user.

16. The one or more non-transitory computer-readable storage media of claim 14, wherein receiving the value further comprises:

receiving the value from the first user in an electronic marketplace in exchange for access to the snapshot of the second user;

communicating a request for access to the snapshot to at least one computing device responsible for the snapshot of the second user; and granting access to the first user for the snapshot of the second user.

17. The one or more non-transitory computer-readable storage media of claim 14, wherein restoring the snapshot further comprises merging at least one of the one or more representations with an existing computing resource belonging to the first user.

18. The one or more non-transitory computer-readable storage media of claim 12, wherein causing one or more of the representations of computing resources to be provisioned further includes providing access to customer data contained within the snapshot, the customer data representing external computing resources external to a provisioning system responsible for the network of computing resources, the external computing resources having to be separately configured.

19. The one or more non-transitory computer-readable storage media of claim 11, wherein a control plane receives the request and prepares a workflow for a data plane to accomplish the traversing at least a portion of the nodes, and providing the order of instantiation.

* * * * *